US009680816B2

(12) United States Patent
Bobbitt et al.

(10) Patent No.: US 9,680,816 B2
(45) Date of Patent: Jun. 13, 2017

(54) ATTESTING AUTHENTICITY OF INFRASTRUCTURE MODULES

(71) Applicant: Cisco Technology, Inc., San Jose, CA (US)

(72) Inventors: Lisa L. Bobbitt, Apex, NC (US); Keith Siracuse, Cary, NC (US); Sam Gupta, Costa Mesa, CA (US); John Toebes, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 92 days.

(21) Appl. No.: 14/513,763

(22) Filed: Oct. 14, 2014

(65) Prior Publication Data

US 2016/0105427 A1    Apr. 14, 2016

(51) Int. Cl.
*H04L 29/06* (2006.01)
*H04L 9/32* (2006.01)

(52) U.S. Cl.
CPC ............ *H04L 63/0807* (2013.01); *H04L 9/32* (2013.01); *H04L 9/3213* (2013.01); *H04L 9/3234* (2013.01); *H04L 9/3263* (2013.01); *H04L 9/3271* (2013.01); *H04L 63/0869* (2013.01); *H04L 63/0876* (2013.01)

(58) Field of Classification Search
CPC ............ H04L 63/0853; H04L 63/0823; H04L 9/3268; H04L 9/32; H04L 9/3213; H04L 63/0807; H04L 63/0869; H04L 63/0876; H04L 9/3234; H04L 9/3263; H04L 9/3271
USPC ................................ 713/158, 150, 155, 159
See application file for complete search history.

(56) References Cited

U.S. PATENT DOCUMENTS

| | | | |
|---|---|---|---|
| 7,017,188 B1 * | 3/2006 | Schmeidler | G06F 21/10 705/57 |
| 7,644,211 B2 | 1/2010 | Toebes et al. | |
| 7,664,136 B2 | 2/2010 | Toebes et al. | |
| 7,707,348 B2 | 4/2010 | Huotari et al. | |
| 7,751,339 B2 | 7/2010 | Melton et al. | |
| 8,069,277 B2 | 11/2011 | Suematsu | |
| 8,078,768 B2 | 12/2011 | Manor et al. | |
| 8,413,885 B2 | 4/2013 | Frad et al. | |

(Continued)

OTHER PUBLICATIONS

Guin et al., "Counterfeit IC Detection and Challenges Ahead", retrieved from Internet 2013, 5 pages.

(Continued)

*Primary Examiner* — Sarah Su
(74) *Attorney, Agent, or Firm* — Edell, Shapiro & Finnan, LLC

(57) ABSTRACT

A user device is provided that includes an authentication application that runs on the user device. A calibration device is also provided that includes authentication algorithm configuration information and an authentication token. The user device is connected to the calibration device to receive the authentication algorithm configuration information and the authentication token. The user device then supplies to a target device to be authenticated an authentication request that includes the authentication token. The user device receives an authentication response from the target device. The user device then analyzes the authentication response with the authentication application based on the authentication algorithm configuration information to determine whether the target device is authenticated.

27 Claims, 11 Drawing Sheets

(56) References Cited

U.S. PATENT DOCUMENTS

| | | | |
|---|---|---|---|
| 8,504,707 B2 | 8/2013 | Toebes et al. | |
| 9,053,063 B2* | 6/2015 | Walter | G06F 15/16 |
| 2005/0033702 A1* | 2/2005 | Holdsworth | G06F 21/34 |
| | | | 705/67 |
| 2005/0138421 A1* | 6/2005 | Fedronic | G06F 21/32 |
| | | | 726/4 |
| 2008/0201765 A1* | 8/2008 | Walter | G06F 15/16 |
| | | | 726/3 |
| 2011/0093516 A1* | 4/2011 | Geng | G06F 8/65 |
| | | | 707/827 |
| 2011/0225090 A1* | 9/2011 | Hammad | G06Q 20/40 |
| | | | 705/44 |
| 2011/0314533 A1* | 12/2011 | Austin | H04L 63/08 |
| | | | 726/9 |
| 2012/0239221 A1* | 9/2012 | Mighdoll | F24F 11/0012 |
| | | | 700/300 |
| 2013/0198516 A1* | 8/2013 | Fenton | H04L 63/0869 |
| | | | 713/168 |
| 2013/0261927 A1 | 10/2013 | Erickson et al. | |
| 2013/0275194 A1* | 10/2013 | Priyasantha | G06Q 20/32 |
| | | | 705/14.23 |
| 2013/0297933 A1* | 11/2013 | Fiducia | H04L 63/0853 |
| | | | 713/156 |
| 2013/0331063 A1* | 12/2013 | Cormier | H04L 63/0272 |
| | | | 455/411 |
| 2014/0048723 A1 | 2/2014 | Pawlik et al. | |
| 2014/0075051 A1* | 3/2014 | Zadesky | G06F 13/122 |
| | | | 710/3 |
| 2014/0205153 A1 | 7/2014 | Sharma et al. | |
| 2014/0223184 A1 | 8/2014 | Novotney et al. | |
| 2014/0259125 A1* | 9/2014 | Smith | G06F 21/57 |
| | | | 726/5 |
| 2015/0031334 A1* | 1/2015 | Wu | H02J 5/005 |
| | | | 455/411 |
| 2015/0052544 A1* | 2/2015 | Kanai | H04N 21/8186 |
| | | | 725/25 |
| 2015/0089597 A1* | 3/2015 | Srinivasan | H04L 63/08 |
| | | | 726/4 |
| 2015/0143123 A1* | 5/2015 | Bergqvist | H04L 63/061 |
| | | | 713/171 |
| 2015/0207626 A1* | 7/2015 | Neftel | G08C 17/02 |
| | | | 713/168 |
| 2015/0222435 A1* | 8/2015 | Lea | H04L 63/0823 |
| | | | 713/155 |
| 2015/0304110 A1* | 10/2015 | Oberheide | H04L 63/06 |
| | | | 713/155 |
| 2015/0312038 A1* | 10/2015 | Palanisamy | H04L 9/3213 |
| | | | 713/155 |
| 2015/0349958 A1* | 12/2015 | Lindell | H04L 9/085 |
| | | | 713/168 |
| 2016/0006718 A1* | 1/2016 | Huxham | G06F 21/31 |
| | | | 726/6 |
| 2016/0094988 A1* | 3/2016 | Lee | H04L 63/126 |
| | | | 380/270 |
| 2016/0105410 A1* | 4/2016 | Zhou | H04W 12/06 |
| | | | 726/9 |
| 2016/0226872 A1* | 8/2016 | Oberheide | G06F 21/44 |

OTHER PUBLICATIONS

VeriSign The Value of Trust, "Open Authentication", http://www.verisign.com/stellent/groups/public/documents/white_paper/005302.pdf, Jan. 2004, pp. 1-13.

IT@Intel Brief, "Network Access Control: User and Device Authentication", Intel Information Technology, Aug. 2005, pp. 1-4.

Cisco, Newer Cisco SBA Guides Available, "Network Device Authentication and Authorization Deployment Guide", Feb. 2012, 28 pages.

Saruhan, "Detecting and Preventing Rogue Devices on the Network", SANS Institute InfoSec Reading Room, Aug. 8, 2007, 63 pages.

* cited by examiner

ATTESTING AUTHENTICITY OF INFRASTRUCTURE MODULES

TECHNICAL FIELD

The present disclosure relates to interfacing with a component of an electrical device.

BACKGROUND

Today there is a need to provide product authentication services to a wide variety of equipment, such as networking equipment. For example, there are certain uses of networking equipment in mission critical networks (e.g., for military, air traffic control, etc.) for which it is important to have rapid feedback for authenticity determination requests. One solution is to have a team of engineers around the world that can respond to requests and perform analysis via photographic evidence.

Aside from the obvious requirement of providing an accurate authenticity determination, it is important to be able to rapidly reply to each inquiry at the volume of authentication requests. This may involve processing authenticity requests by either photographic descriptions of the product, or by having the product physically sent to one of several lab locations for analysis. Products that are physically analyzed are then returned to the requester after authenticity has been determined.

DESCRIPTION OF EXAMPLE EMBODIMENTS

Overview

In one embodiment, a user device is provided that includes an authentication application that runs on the user device. A calibration device is also provided that includes authentication algorithm configuration information and an authentication token. The user device is connected to the calibration device to receive the authentication algorithm configuration information and the authentication token. The user device supplies to a target device to be authenticated an authentication request that includes the authentication token. The user device receives an authentication response from the target device. The user device analyzes the authentication response with the authentication application based on the authentication algorithm configuration information to determine whether the target device is authenticated.

EXAMPLE EMBODIMENTS

Photographic analysis is one way to conduct authenticity analysis of equipment, and using photography removes the shipment time of the physical product. However, delays can result when insufficient photographs are submitted or if the photographs are of poor quality. Physical inspection also imparts its own issues on the authenticity determination process. Aside from the transit time of the material, products must be tracked in accordance with strict chain-of-custody procedures. This not only adds overhead, but also requires a dedicated evidence custodian log. Once analysis is complete, the evidence custodian must log the product(s) back in and then return the product(s) to the requester.

Compounding the time required for authenticity analysis is the increasing sophistication of counterfeit gear. As counterfeiters produce devices, they gain experience in design and manufacturing activities, leading to more complex counterfeit products for authentication engineers to review.

In response, equipment manufacturers are now adding anti-tamper Hardware Security Modules (HSMs) as a root of trust with the manufacturer. Furthermore, manufacturer-provided identity certificates serve as an immutable identity available once the hardware is powered on, booted, and has a path for the attestation to occur. Access to this information when the hardware is not powered up via its own power source is not available, making it inefficient for manufacturers, partners, worldwide customs teams, and end customers to validate the hardware during the delivery and acceptance stages of the life cycle.

A scheme is presented herein to accurately and independently verify the authenticity of equipment, that is, to obtain indication that a product is a genuine product of a manufacturer or vendor as the types of counterfeiting and tampering change and accelerate. These techniques allow for conveniently performing the authenticity checks and remove the need for highly trained engineers to assist in the authentication process, releasing those resources for other critical tasks.

Figure 1:
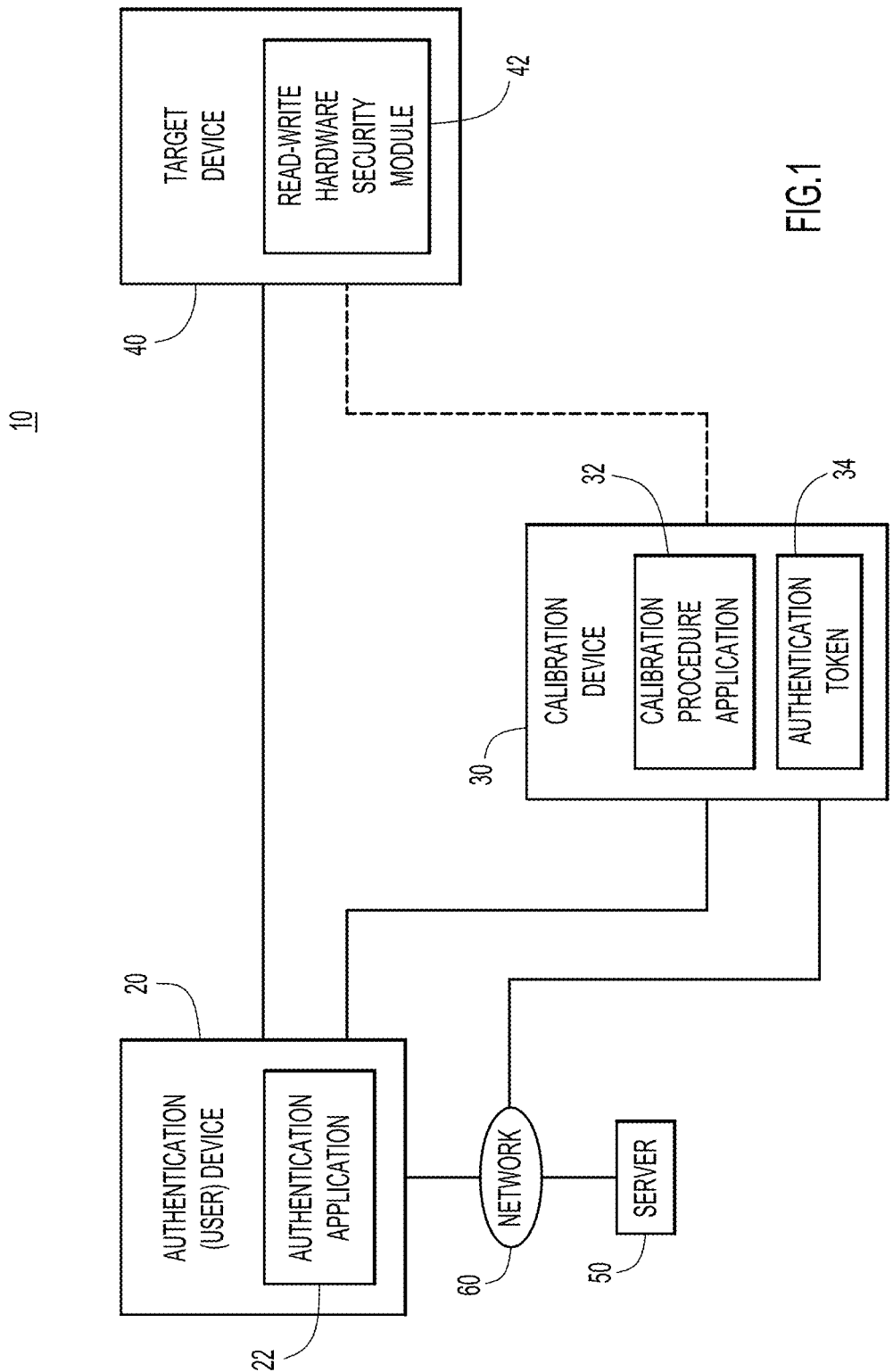
FIG. 1 is a block diagram of a system including an authentication (user) device and a calibration device arranged to attest for the authenticity of a target device, according to an example embodiment.

Reference is first made to FIG. 1. FIG. 1 shows a system 10 that includes an authentication device 20 (also referred to as a user device), a calibration device 30 and a target device 40. The target device 40 is the device to be authenticated. The authentication device 20 could take a variety of forms. One form is a mobile user device, such as a smartphone, tablet computer device, laptop device, etc. The authentication device 20 includes a software authentication application 22 that is downloaded to the authentication device 20, from, for example, a server 50 to which the authentication device 20 can communicate via network 60 (e.g., the Internet). For example, the authentication application may reside at a server 50 that is part of a private enterprise network, or on a public network (e.g., an App Store) that may require user identity authentication before installation on the authentication device 20.

The calibration device 30 is provided to verify that the authentication application 22 is legitimate, and that the authentication application 22 is up-to-date. The calibration 30 runs a calibration procedure application 32 to verify the authentication application 22 and supplies an authentication token 34 (stored in the calibration device 30) to the authentication device 20 for use by the authentication application 22. The calibration procedure application 32 may have an expiration date such that it may be necessary for it to connect to the server 50 in order to update the calibration procedure application 32 and obtain an updated authentication token. This is useful to prevent misuse if the calibration device 30 falls into the hands of an unauthorized user.

Other information, such as inputs of pictures of the label on the box of the target device, the serial number of the target device, or the serial number/product identifier selected from a list could further strengthen the calibration procedure. The authentication token can be used for time-stamping of calibration records and logging of authenticated users.

The calibration device 30 may take the form of a dongle or a form similar to that of the target device 40. The authentication device 20 is connected to the calibration device 30 and the calibration procedure application 32 is executed to confirm that the authentication application 22 is legitimate, up-to-date, and that a user of the authentication device 20 is authorized. Upon completion of the calibration procedure, the calibration device 30 will send the authentication token 34 to authentication device 20 for use by the authentication application 22. This sets the stage for the authentication application 22 to authenticate the target device 40.

The authentication device 20 may be connected first to the calibration device 30, and after the calibration procedure is run, the authentication device 20 is disconnected from the calibration device 30 and connected to the target device 40. In another form, the calibration device 30 is connected to the target device 40 at the same time the authentication device 20 is connected to the calibration device 30, during the execution of the calibration procedure. This is indicated by the dashed line connection in FIG. 1 between the calibration device 30 and the target device 40.

The target device 40 may be any device that needs authentication, either on a one-time basis or on an ongoing basis. In one example, the target device 40 is a network device, such as a switch, router, firewall, etc. The target device 40 includes a read-write hardware security module (HSM) 42. The HSM 42 stores one or more unique identifiers and has user/password controls. An example of a secure unique device identifier is the Secure Universal Device Identifier (SUDI) certificate in place today in many network devices. The SUDI includes both a product identifier and a serial number of the device. This SUDI is pre-populated in the tamper-resistant read-write HSM 42. The target device 40 can be utilized in a powered-on or a powered-off state via a wired (or otherwise secured) connection or a dedicated port.

Further details about the operation of the system 10 are described hereinafter in connection with FIG. 7.

Figure 2:
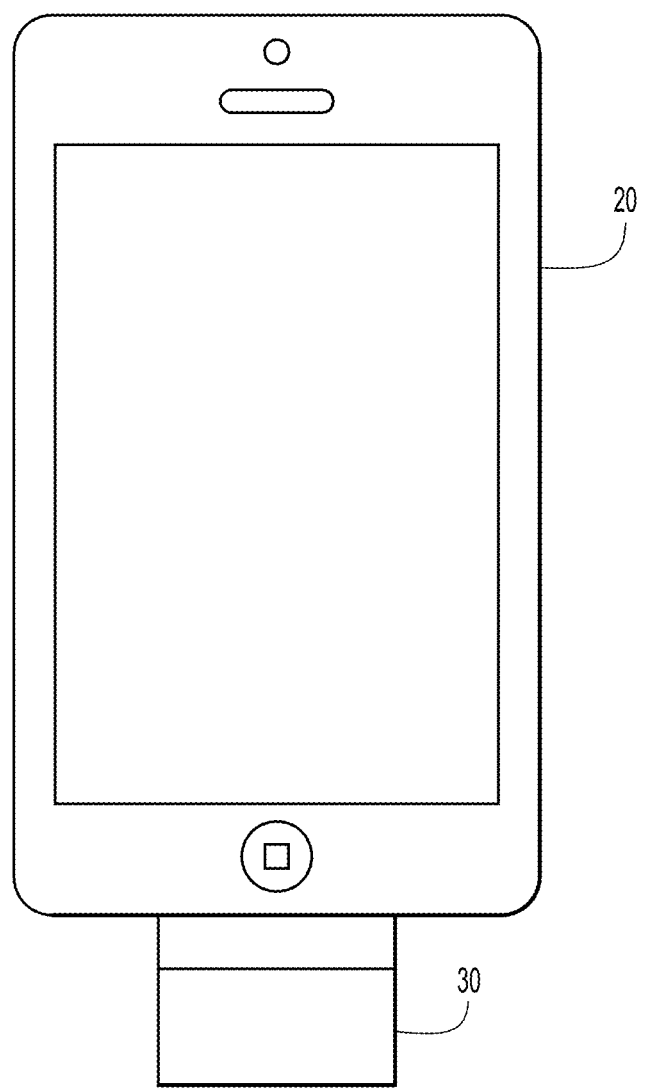
FIG. 2 illustrates the authentication device connected to the calibration device, according to an example embodiment.

Reference is now made to FIG. 2. FIG. 2 shows an example of a form factor for the authentication device 20 and the calibration device 30. The authentication device 20, in this example, has the form of a smartphone. The smartphone is perhaps the simplest and easiest form for the authentication device 20 and is something already in existence today and carried by a large portion of a targeted customer base. Using a smartphone as the authentication device 20 removes the need to build and distribute a special computing platform for this purpose. The authentication application 22 could be written so as to guide the user through the authentication process.

Using a smartphone as the authentication device shifts the problem from distribution of a specific authentication tool to minimizing the ubiquity of a smartphone. This can be controlled by the calibration device 30 that is only released to certain users, and that features an inherent expiration date, as described above. FIG. 2 shows that the calibration device 30 may take the form of a dongle that connects to the smartphone.

The arrangement shown in FIG. 2 is only an example. The authentication device 20 may take on other form-factors, such as a laptop computer or tablet computer. The connection between the authentication device 20 and calibration device may be a commercial off-the-shelf cable, e.g., Universal Serial Bus (USB) cable. The calibration device 30 may also take the form of a USB dongle that connects to the authentication device 20, which is useful if the authentication device 20 is a laptop computer.

The calibration device 30 is used to initialize the authentication application 22 on the authentication device 20. The calibration device 30 can then either remain in place on a connector of the smartphone, or is removed to leave the connector available for connection to the target device. If the design choice requires the calibration device 30 to remain connected to the authentication device during the authentication process of the target device, then the calibration device 30 has a port to allow connection to the target device 40, as shown in FIG. 1 by the dashed lines, or a secondary port attached to the authentication device 20 is used to connect to the target device 40.

Figure 3:
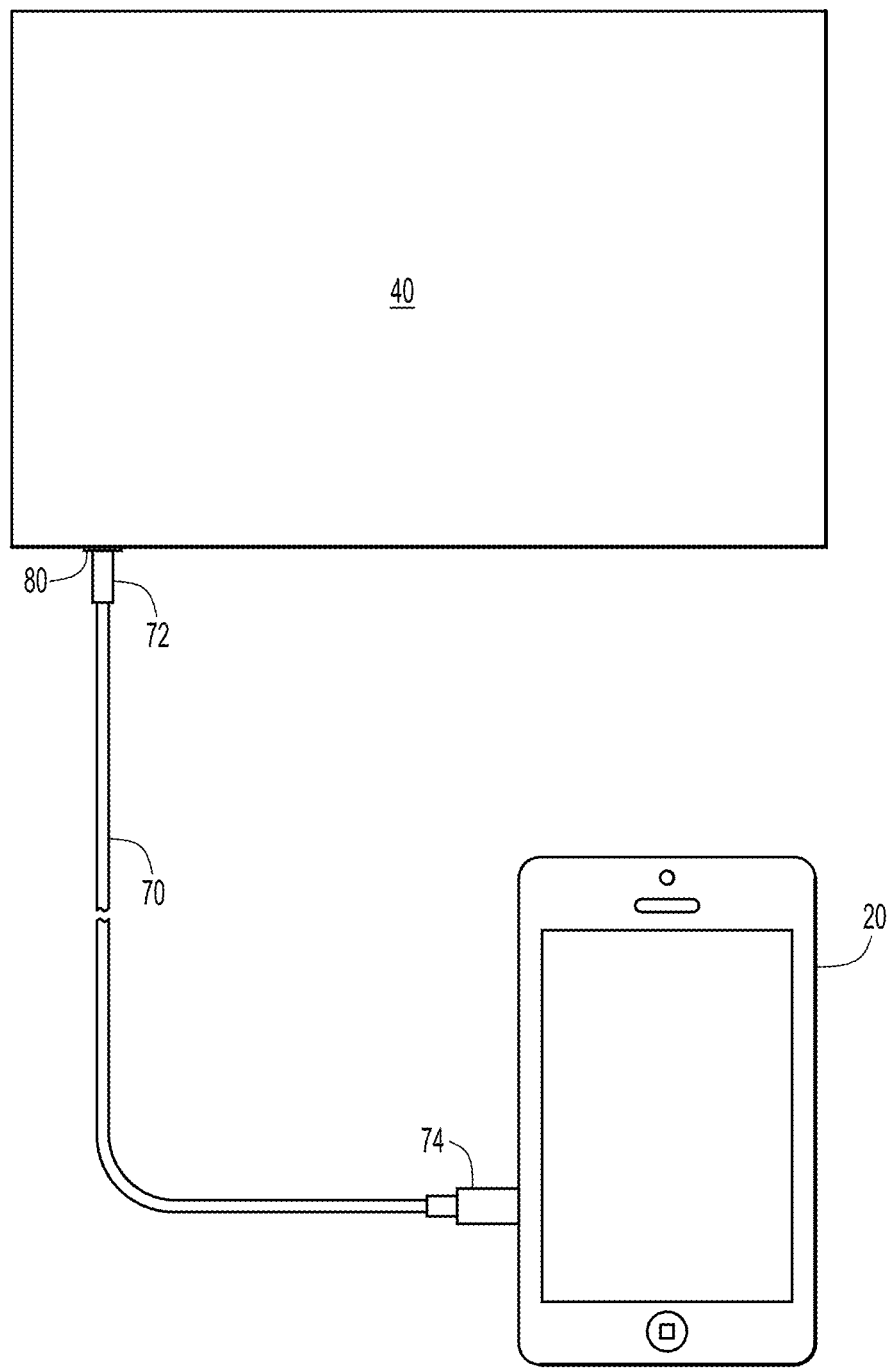
FIG. 3 illustrates the authentication device connected to the target device, according to an example embodiment.

Turning now to FIG. 3, an example is shown in which the authentication device 20 is connected to the target device 40. In this example, the authentication device 20 has a smartphone form-factor and the target device 40 is a network switch or router. The connection between the authentication device 20 and the target device 40 is a USB cable 70 that has a USB connector 72 at one end to connect to a USB port 80 on the target device 40 and a connector 74 on the other end that is suitable to connect to the authentication device 20.

Power for the authentication function performed by the authentication device 20 on the target device 40 may be provided over a USB interface (or other suitable interface) to the HSM 42 of the target device 40. The externally supplied power would be a secondary means of power, used when the target device is not powered up and running in a conventional manner. To this end, reference is now made to FIG. 4.

Figure 4:
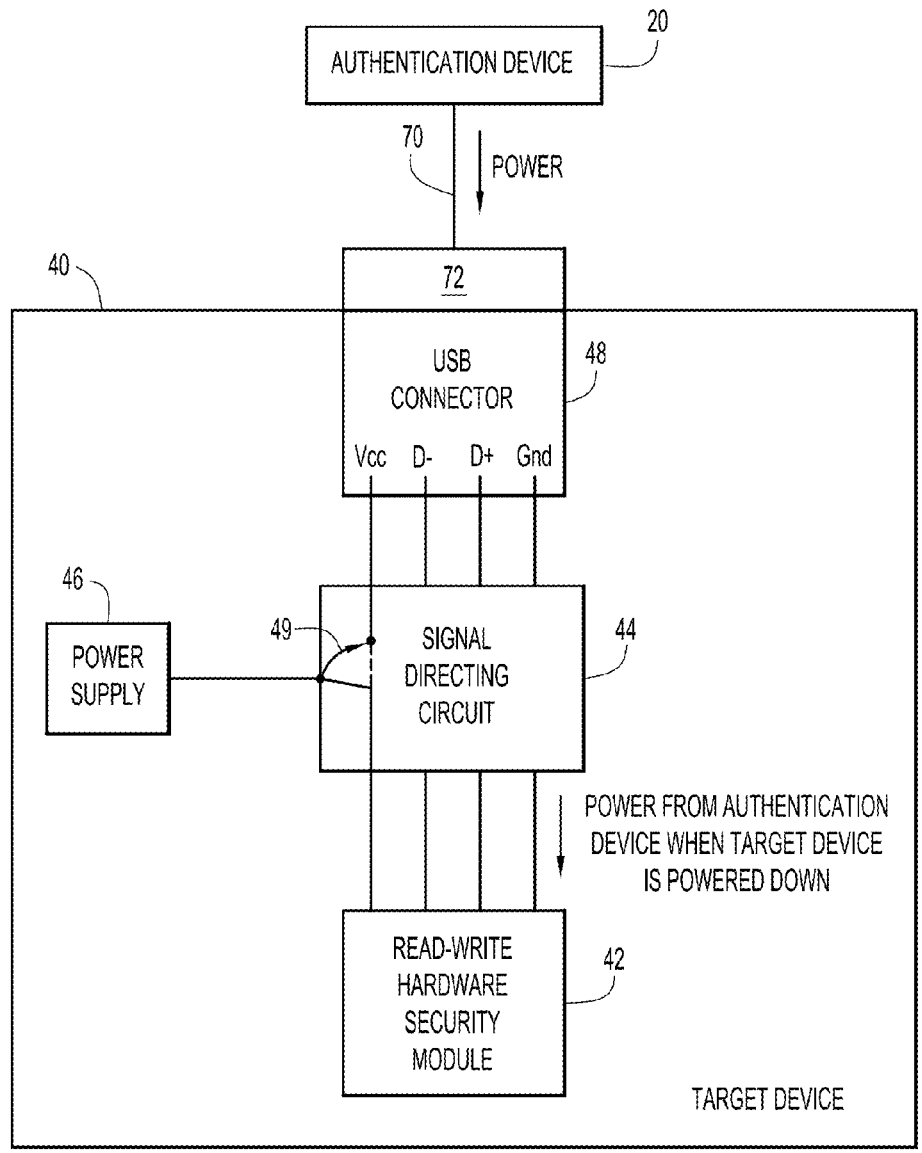
FIG. 4 is a block diagram illustrating one form of the target device in which communication may be achieved with the target device when the target device is powered-down, according to an example embodiment.

FIG. 4 illustrates target device 40 connected to authentication device 20 by cable 70 with USB connector 72. The target device 40 includes the read-write HSM 42, a signal directing circuit 44, a power supply 46 and a USB connector 48. The configuration of target device 40 shown in FIG. 4 is one in which power from the authentication device 20 is supplied to the target device 40 to power the read-write HSM 42 when the target device 40 is powered-down and thus not otherwise able to power the read-write HSM 42.

When the target device 40 is powered-up, the power supply 46 supplies power to the components of the target device 40, including the HSM 42. However, when the target device 40 is powered-down, the power supply 46 is off and therefore, none of the components in the target device 40 are receiving power.

The signal directing circuit 44 is provided in the target device to respond to the state of the power supply 46 such that when the power supply 46 is on, the read-write HSM 42 receives power from the power supply 46, and when the power supply 46 is off, power originating from a USB host processor on the authentication device 20 is supplied via the USB connector 48 and the signal directing circuit 44 directs that power to the HSM 42. For example, there are four pins on the USB connector 48: Vcc, D−, D+ and Gnd. Pins D− and D+ are used to carry data for USB. Vcc is the power line. The signal directing circuit 44 performs a switching function, logically depicted by switch 49. The switch 49 connects to the power supply 46 when the power supply 46 is on, and connects to the Vcc line on the USB connector 48, when the power supply 46 is off. There are numerous ways to achieve the switching function of the signal directing circuit 44, including a relay, an analog switch, diodes connected appropriately across pin connections, etc.

If it is not necessary to be able to communicate with (and authenticate) the target device 40 when it is powered-down, then the signal directing circuit 44 shown in FIG. 4 is not needed.

Figure 5:
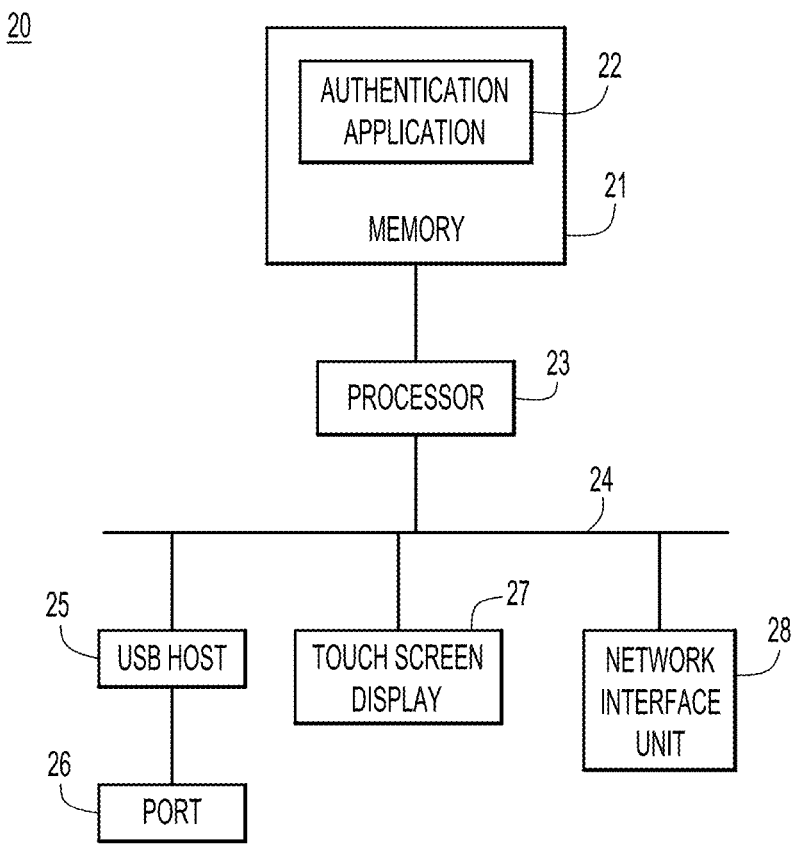
FIG. 5 is a block diagram of the authentication device, according to an example embodiment.

Reference is now made to FIG. 5. FIG. 5 illustrates a block diagram for the authentication device 20. The authentication device 20 includes a memory 21 that stores the authentication application 22, a processor 23, a bus 24, a USB host 25, a USB port 26, a touch screen display, and a network interface unit 28. These are only examples of components that may be present in the authentication device 20. The memory 21 may comprise read only memory (ROM), random access memory (RAM), magnetic disk storage media devices, optical storage media devices, flash memory devices, electrical, optical, or other physical/tangible memory storage devices. The processor 23 is, for example, a microprocessor or microcontroller that executes instructions for the authentication application 22 stored in memory 21. Thus, in general, the memory 21 may comprise one or more tangible (non-transitory) computer readable storage media (e.g., a memory device) encoded with software comprising computer executable instructions and when the software is executed (by the processor 23) it is operable to perform the operations described herein.

The bus 24 connects the processor 23 to the various other components in the authentication device 20. The USB host 25 enables USB host communications with other devices, e.g., the target device 40. The port 26 is provided to enable USB connectivity for the authentication device 20. It is possible that the port 26 is a USB port or is a proprietary port that converts between a proprietary format and USB format. The touch screen display 27 is an example of a user interface mechanism of the authentication device 20. The network interface unit 28 enables, for example, either or both of wireless local area network (WLAN) connectivity (e.g., Wi-Fi™ connectivity) and wireless wide area network (WWAN) connectivity (e.g., 4G or Long Term Evolution (LTE)). The network interface unit 28 may further include wired network connectivity capability. Thus, in this regard, the network interface unit 28 may be a multi-mode network interface device, or a collection/combination of several network interface devices.

In one form, the authentication application 22 performs one or more algorithms based on more than one input (including information obtained from the target device). The authentication application 22 uses the authentication token (supplied by the calibration device 30) to access identifiers in the HSM of the target device it is attempting to authenticate. All fields of data being compared may need to match exactly to be authenticated. The application may return an Authenticated/Not Authenticated result to the display screen of the authentication device 20 as well as log the authentication results at a central storage location. The authentication application logs could also capture this information and provide output for reporting to a central storage location, e.g., server 50 shown in FIG. 1.

Figure 6:
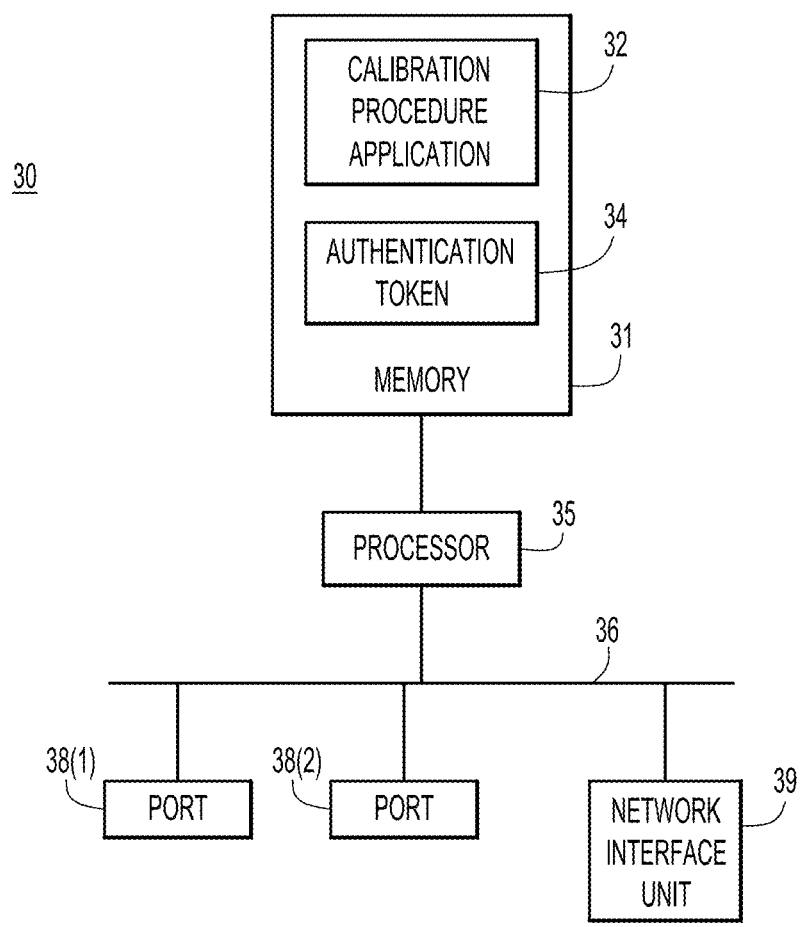
FIG. 6 is a block diagram of the calibration device, according to an example embodiment.

Turning now to FIG. 6, a block diagram of the calibration device 30 is now described. The calibration device 30 may take on a variety of forms, as described above. For simplicity, FIG. 6 shows the basic components of the calibration device 30 regardless of the form-factor that it takes on. The calibration device 30 includes a memory 31 that stores the calibration procedure application 32 and the authentication token 34. A processor 35 is provided that connects to memory 31 and to a bus 36. Ports 38(1) and 38(2) and a network interface unit 39 are provided, which are connected to the bus 36. The processor 35 may be a microprocessor or microcontroller that executes the calibration procedure application 32. The port 38(1) facilitates connection of the calibration device 30 to the authentication device 20. Port 38(2) is provided to connect to the target device 40 so that the calibration device 30 can be connected simultaneously to the authentication device 20 and the target device 40. The network interface unit 39 enables, for example, either or both of wireless local area network (WLAN) connectivity (e.g., Wi-Fi™ connectivity) and wireless wide area network (WWAN) connectivity (e.g., 3G, 4G or Long Term Evolution (LTE)). The network interface unit 39 may further include wired network connectivity capability. Thus, in this regard, the network interface unit 39 may be a multi-mode network interface device, or a collection/combination of several network interface devices. It should be understood that the calibration device 30 may not need a network interface unit 39, in which case it has a "built-in" or predefined validity period, after which an entirely new calibration device needs to be obtained. Conversely, the port 38(2) and the network interface unit 39 are optional. In fact, the authentication device 20 is able to use its own network connection to obtain new information for the calibration device 30 and communicate it to the calibration device 30 via port 38(1).

Figure 7:
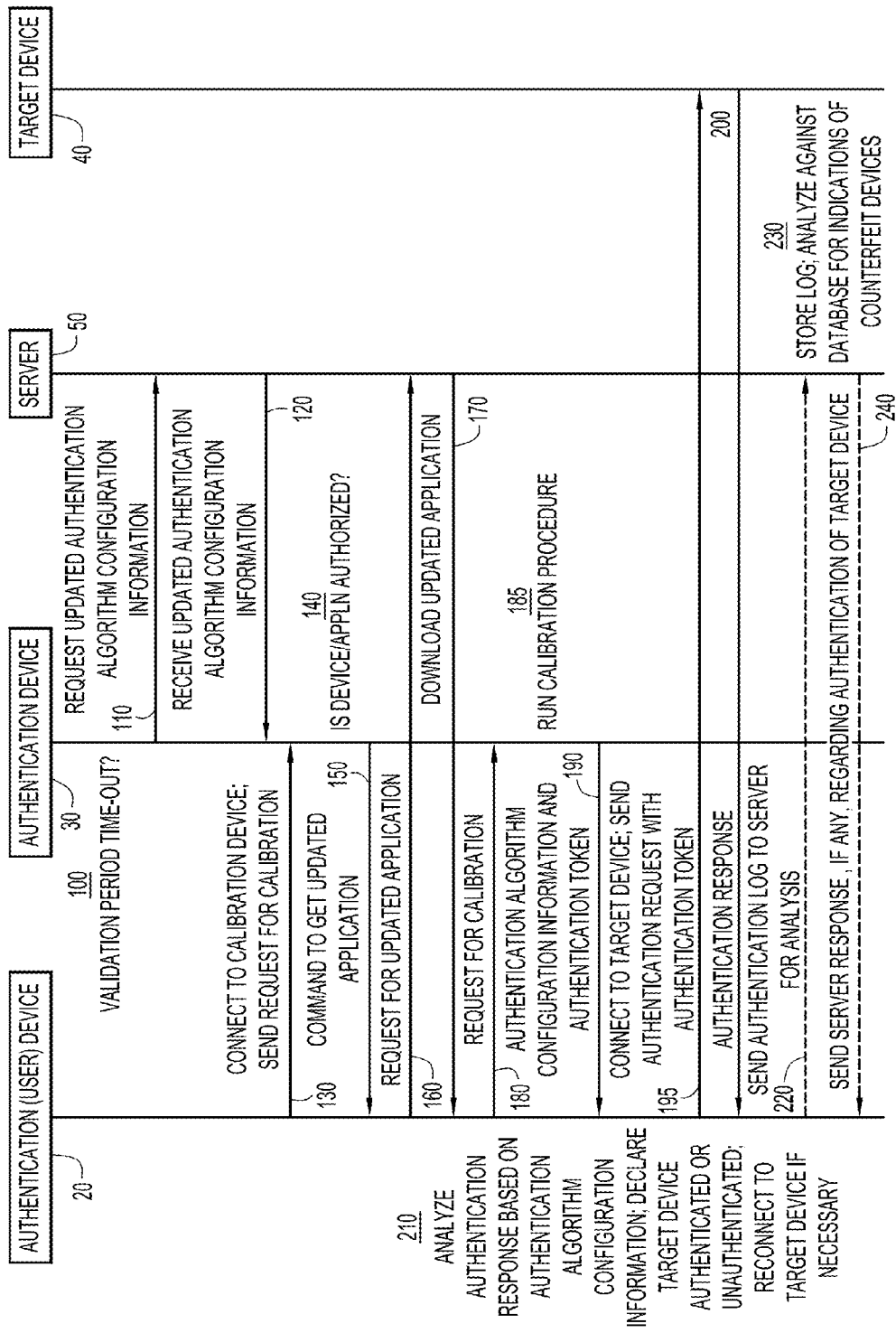
FIG. 7 is a ladder sequence diagram depicting flow of communications between devices in connection with authenticating the target device, according to an example embodiment.

Reference is now made to FIG. 7. FIG. 7 illustrates a ladder sequence diagram that depicts the operations and message exchanges between the authentication device 20, calibration device 30 and target device 40, according to an example embodiment. At 100, when the calibration application 32 on calibration device 30 is first invoked, either through automatic invocation at boot up time or the user requesting the application to be run, the calibration application 32 running on the calibration device 30 is configured to determine whether a pre-configured validation period has time-out. That is, the calibration application 32 may be configured to perform calibration operations for a predetermined period of time, after which updated authentication algorithm configuration information needs to be obtained. This prevents continued and indefinite unauthorized use of the calibration device 30 if it falls into the possession of an unauthorized party/parties. The attributes that define what to look for when authenticating a target device may change. Only the vendor of the target devices would know about and make the changes to the attributes to be used when authenticating a target device. These changes are contained within the authentication algorithm configuration information supplied by the calibration device 30 in response to receiving a calibration request from the authentication device 20. Thus, if at 100, the calibration application 32 determines that it has timed-out, at 110, it communicates with server 50 to request updated authentication algorithm configuration information. At this time, the server 50 authenticates the calibration device 30 with user credentials. If the calibration device 30 is authenticated, the server sends updated authentication algorithm configuration information that is received, at 120, by the calibration device 30 and installed on the calibration device 30. The authentication algorithm configuration information may include information describing the authentication application 22 running on the authentication device 20 as to the parameters/attributes to be considered during authentication to be performed on the target device 40.

At 130, the authentication device 20 is connected to the calibration device 30, and the authentication device 20 sends a request for calibration to the calibration device 30. At 140, the calibration device determines whether the authentication device/authentication application is authorized and up-to-date. If it is determined that the authentication application 22 is not up-to-date, then at 150, a command is sent to the authentication device 20 to cause the authentication device to get an updated authentication application, such as through an online application store process or other application update/delivery mechanism. At 160, the authentication device 20 sends to the server 50 a request for an updated authentication application. At 170, the server downloads the updated authentication application to the authentication device 20. In one form, the system may be configured/designed such that the calibration device 30 is the only device that communicates with the server 50, and which stores the latest version of the authentication application 22.

At 180, the authentication device 20, now having the updated authentication application, sends a request for calibration to the calibration device 30. At 185, the calibration device 30 runs the calibration procedure. The calibration procedure may vary. In general, the calibration procedure generates authentication algorithm configuration information and an authentication token, both of which are supplied to the authentication device 20. As explained above, the authentication algorithm configuration information informs the authentication application 22 running on the authentication device 20 as to the parameters/attributes to be considered during authentication to be performed on the target device 40. Examples of such parameters include any and all unique markers of the target device 40 as well as environmental elements, such as time of day, location, etc., for the authentication procedure run on the target device. Another example is the comparison of the product build date of the target device with the current date.

Baseline information in the secure hardware identity (SUDI), such as the serial number, product identifier (PID), as well as specific information about the target device 40, such as default software image loaded, size of that image, number of interfaces, time of last software download, and logs, may be randomly selected and used as a basis to authenticate the target device 40. The procedure is flexible to continue to provide the strongest protection as attacks on genuineness of products continue. Again, the authentication algorithm configuration information specifies which one or more unique values obtained from the target device (from the HSM 42 of the target device) are to be analyzed for authentication purposes, and any associated phases to be used, such as connecting to the target device and running the authentication application a first time to generate first authentication results, disconnecting from the target device, re-connecting to the target device, and running the authentication application a second time to generate second authentication results, and comparing the first and second authentication results to be sure they conform to or are consistent with a specification set by the authentication algorithm configuration information.

The calibration procedure run by the calibration device 30 also outputs to the authentication device 20 an authentication token (i.e., "golden token") that resides in the calibration device 30. This authentication token is provided to the authentication application 22 from the calibration device 30, and it may include an identifier of the authentication device 20 to which the authentication token is provided.

At 190, the calibration device 30, after running the calibration application, sends authentication algorithm configuration information and the authentication token to the authentication device 20. After calibrating the authentication application 22 on the authentication device, the authentication application 22 knows what to look for when attempting to authenticate target the device 40. The authentication device 20 is ready to authenticate the target device 40.

At 195, the authentication device 20 is connected to the target device 40 (if it is not already connected to it, i.e., during the calibration procedure) and the authentication device 20 sends an authentication request, together with the authentication token, to the target device 40.

At 200, the target device 40 sends an authentication response to the authentication device 20. At 210, the authentication device analyzes the authentication response based on the authentication algorithm configuration information. Based on the authentication response, the authentication device 20 declares that the target device 40 is authenticated (genuine) or unauthenticated (not genuine). Depending on the authentication algorithm configuration information, the authentication device 20 may need to be disconnected from the target device 40 and then reconnected to it, in order to send an additional authentication request and receive an additional authentication response for further analysis in order to determine whether the target device 40 is authenticated.

The authentication application 22 makes the decision of whether or not the target device 40 is authenticated. For example, the authentication application 22, in the authentication request, indicates that it has been authenticated by the accompanying authentication token. The target device stores/remembers that and in the authentication response includes the authentication token back to the authentication application. In fact, the target device 40, in the authentication response, may include a list of the (identifiers of) authentication devices that have attempted to authenticate (or have authenticated) the target device over some period of time. This list contains the authentication token information that has been presented to the target device 40 over some period of time. The authentication response generated by target device 40 may further include identifier information of the target device (examples of which are described above), as well as an enumeration of previous attempts to authenticate the target device by other authentication devices.

The criteria for determining whether the target device 40 is authenticated may vary depending on the authentication algorithm configuration information. For example, the authentication application may evaluate information indicating previous authentication attempts made on the target device (contained in the authentication response) and if the authentication application does not recognize the devices or users of those previous authentication attempts, the target device is not authenticated. Further still, the authentication application may evaluate locations of authentication attempts and time-stamps between authentication attempts made on the target device to determine whether it is possible for that target device to travel distances between those authentication attempts. If the distance between authentication attempts is not possible, the target device is not authenticated. As still another example, the authentication device 20 is connected to the target device 40 and the authentication algorithm is run. Then, the authentication device 20 is disconnected and then reconnected to the target device and the authentication algorithm run again. The authentication response received the second time that the authentication algorithm is run should be consistent with the authentication response received the first time it is run, otherwise the target device 40 is deemed not authenticated.

At 220, as an optional step, an authentication log is created from the authentication response, and, at 230, this log is sent to the server 50. The server stores the authentication response and analyzes it against a database that includes data indicative of counterfeit devices. This may help more quickly identify when a particular type of target device has been cloned and mass produced by counterfeiters. More generally, data analysis of this type could yield additional information, such as a serial number that is being repeatedly duplicated, and may even help to track back to the source location of the counterfeiting, for example. At 240, server 50 sends a response, if any, regarding the authentication of target device 40 to user device 20.

Figure 8A:
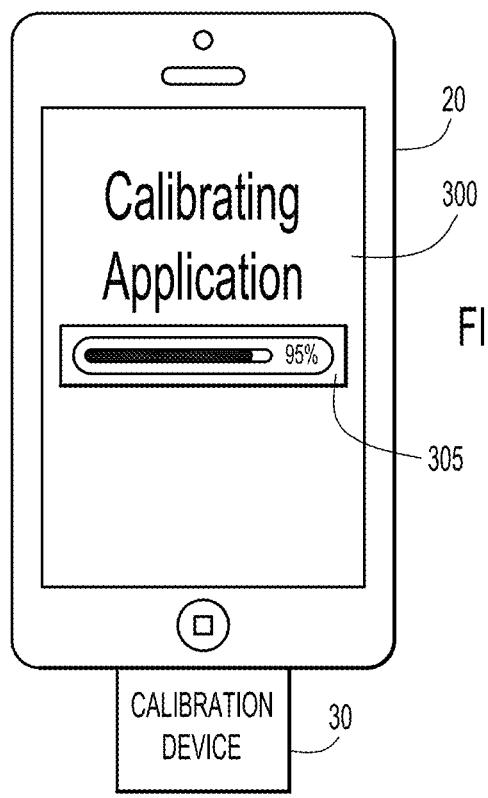
FIGS. 8A-8E illustrate graphical user interface screens on the authentication device during steps of the process depicted in FIG. 7, according to an example embodiment.
Figure 8B:
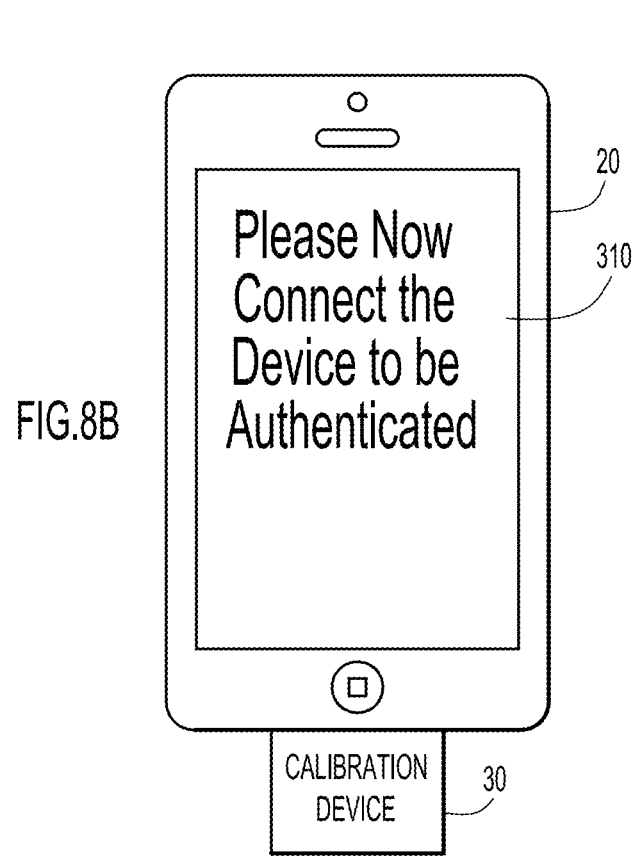

Reference is now made to FIGS. 8A-8E, which illustrate example graphical user interface (GUI) screens presented to a user of the authentication device 20 during various stages of the process depicted in FIG. 7. In FIG. 8A, the authentication device 20 is connected to the calibration device 30. In this example, the calibration device 30 is in the form of a dongle. Upon connecting the authentication device 20 to the calibration device 30, the calibration procedure is executed. A textual message is displayed to the user at reference numeral 300, such as "Calibrating Application." In addition, a bar 305 may be displayed to indicate the percentage of completion of the calibration procedure. When the calibration procedure is completed, a textual message 310 may be presented to the user, as shown in FIG. 8B, e.g., "Please Now Connect to Device to be Authenticated."

Figure 8C:
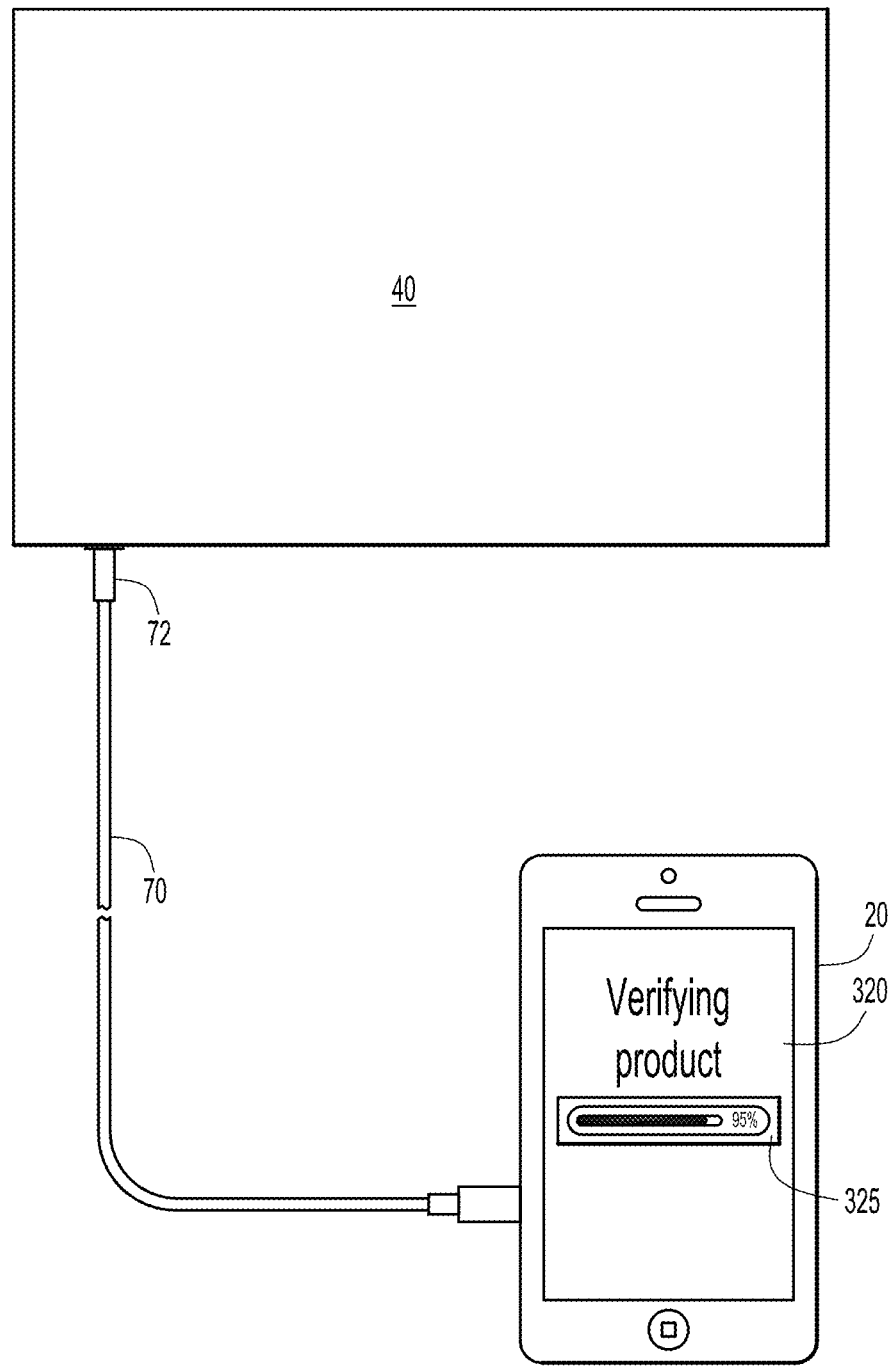

FIG. 8C illustrates the authentication device 20 connected to the target device 40, with the authentication algorithm running. While authentication algorithm is running, a textual message "Verifying Product" or other similar message as shown at reference numeral 320 may be displayed to the user. In addition, a percentage of completion indicator 325 may be displayed.

Figure 8D:
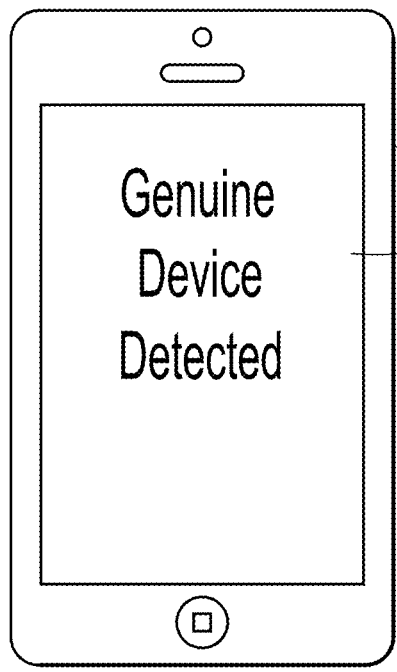
Figure 8E:
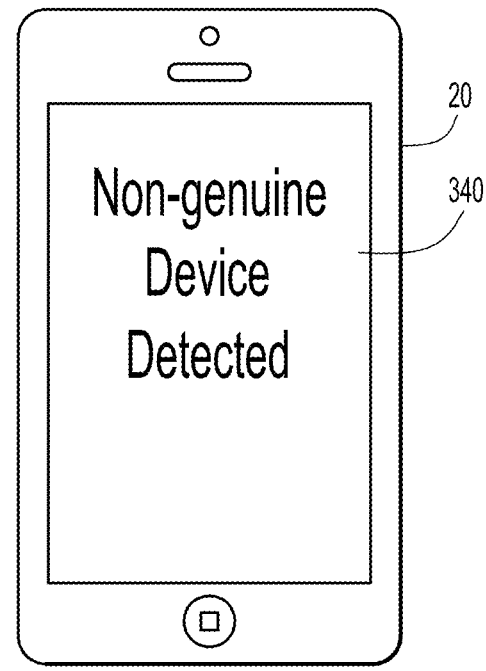

Depending on whether the device is determined to be authenticated, one of two different messages may be presented to the user on authentication device 20. FIG. 8D illustrates a message "Genuine Device Detected" 330 that may be displayed on authentication device 20 if the target device 40 is determined to be authenticated. Conversely, FIG. 8E illustrates a message "Non-Genuine Device Detected" 340 that may be displayed on authentication device 20 if the target device 40 is determined not to be authenticated.

Figure 9:
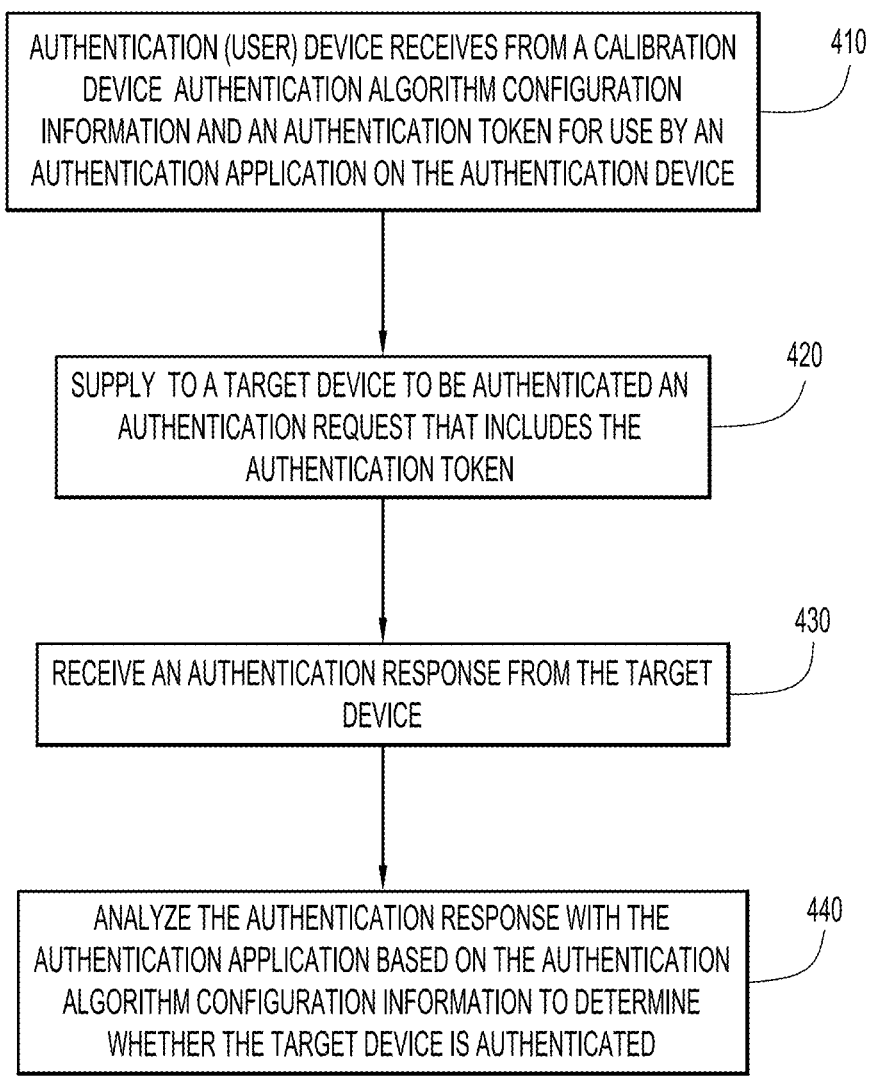
FIG. 9 is a flow chart depicting operations performed by the authentication device, according to an example embodiment.

Reference is now made to FIG. 9, which provides a flow chart for a method 400 according to an example embodiment. The order of the boxes shown in FIG. 9 is not meant to specifically limit any technique presented herein to a particular order of steps or operations, unless an particular order or sequence is otherwise specifically stated. At 410, an authentication device (also called a user device) that includes an authentication application, receives from a calibration device authentication algorithm configuration information and an authentication token. At 420, the user device supplies to a target device to be authenticated, an authentication request that includes the authentication token. The authentication token may include a user device identifier associated with the user device. The authentication request is, for example, supplied to a read/write hardware security module in the target device. At 430, the user device receives an authentication response from the target device. As explained above in connection with FIG. 7, the authentication response may include one or more user device identifiers associated with corresponding one or more user devices which have attempted to authenticate the target device. At 440, the user device analyzes the authentication response with the authentication application based on the authentication algorithm configuration information to determine whether the target device is authenticated. Said another way, at 440, the user device determines whether the target device is authenticated by analyzing the authentication response with the authentication application based on the authentication algorithm configuration information. The authentication response may include a target device identifier stored by the read-write hardware security module in the target device, and the analyzing operation 440 may include analyzing the one or more user device identifiers and the target device identifier to determine whether the target device is authenticated.

To summarize, a read/write mechanism is provided in the target device and a golden token mechanism passes some information during the calibration procedure to an authentication application running on an authentication device. The authentication application passes that information to the target device, and receives some sets of attributes and list of previous attempts to authenticate that target device, which are analyzed to determine whether the target device is authentic. The responses for the attempts need not be identical, such as, if the response includes the number of times it has been authenticated.

These techniques allow for determining authenticity of a device without reliance on photographic or physical inspection. This solution is flexible enough in order to stay ahead of counterfeiters as it can be updated with new authentication algorithms as the need arises. Finally, authentication need not require Internet access or communication back to the manufacturer.

Moreover, these techniques provide a more efficient and reliable method for a manufacturer, partners of manufacturers, and law enforcement agencies (e.g., governmental customs services, etc.) to determine the authenticity of hardware with an immutable identity established at time of manufacturing. This solution presented exploits the ubiquity of smartphone platforms to minimize training and implementation costs.

In summary, a method is provided comprising: at a user device that includes an authentication application that runs on the user device, receiving from a calibration device authentication algorithm configuration information and an authentication token; supplying to a target device to be authenticated an authentication request that includes the authentication token; receiving an authentication response from the target device; and analyzing the authentication response with the authentication application based on the authentication algorithm configuration information to determine whether the target device is authenticated.

In another form, a system is provided comprising: a calibration device that includes authentication algorithm configuration information and an authentication token; and a user device that includes an authentication application that runs on the user device and is used for authenticating a target device, wherein the user device: receives from the calibration device authentication algorithm configuration information and the authentication token; supplies to the target device an authentication request that includes the authentication token; receives an authentication response from the target device; and analyzes the authentication response with the authentication application based on the authentication algorithm configuration information to determine whether the target device is authenticated.

In still another form, an apparatus is provided comprising: at least one interface to enable connectivity to other devices; a processor that executes an authentication application to: receive from a calibration device authentication algorithm configuration information and an authentication token; generate for supply to a target device to be authenticated, an authentication request that includes the authentication token; and analyze an authentication response received from the target device to determine whether the target device is authenticated based on the authentication algorithm configuration information.

In still another form, one or more non-transitory computer readable storage media are provided encoded with instructions that, when executed by a processor, cause the processor to perform operations including: receiving authentication algorithm configuration information and an authentication token; generating and supplying to a target device to be authenticated an authentication request that includes the authentication token; receiving an authentication response from the target device; and analyzing the authentication response with the authentication application based on the authentication algorithm configuration information to determine whether the target device is authenticated.

The above description is intended by way of example only. Various modifications and structural changes may be made therein without departing from the scope of the concepts described herein and within the scope and range of equivalents of the claims.

What is claimed is:

1. A method comprising:
   at an authentication device that includes an authentication application that runs on the authentication device:
      sending to a calibration device a calibration request requesting authorization of the authentication device, wherein the authorization of the authentication device includes verifying that the authentication application on the authentication device is up-to-date;
      in response to the calibration request, receiving an updated version of the authentication application if the calibration device determines that the authentication application is not up-to-date, wherein the updated version of the authentication application is obtained from an authentication server;
      receiving from the calibration device authentication algorithm configuration information and an authentication token, wherein the authentication algorithm configuration information includes information identifying one or more parameters or attributes to be authenticated by the authentication device that are associated with a target device, and the authentication token includes an authentication identifier associated with the authentication device;
      sending to the target device to be authenticated an authentication request that includes the authentication token received from the calibration device;
      receiving an authentication response from the target device, wherein the authentication response includes a target device identifier associated with the target device; and
      determining whether the target device is authenticated by analyzing the authentication response with the authentication application based on the one or more parameters and attributes identified in the authentication algorithm configuration information.

2. The method of claim 1, wherein sending the authentication request to the target device to be authenticated comprises supplying the authentication request to a read-write hardware security module in the target device.

3. The method of claim 1, wherein the authentication token associated with the authentication device indicates that the authentication application has been updated.

4. The method of claim 1, wherein the authentication response includes one or more authentication device identifiers associated with corresponding one or more authentication devices that have attempted to authenticate the target device.

5. The method of claim 4, wherein the target device identifier is stored by a read-write hardware security module in the target device, and wherein analyzing the authentication response with the authentication application comprises analyzing the one or more authentication device identifiers and the target device identifier to determine whether the target device is authenticated.

6. The method of claim 1, further comprising:
   determining whether a validity period of the authentication algorithm configuration information has expired; and
   downloading from a server updated authentication algorithm configuration information when it is determined that the validity period of the authentication algorithm configuration information has expired.

7. The method of claim 1, further comprising sending authentication results generated by the authentication device on the basis of the authentication response to a server for storage.

8. The method of claim 7, further comprising analyzing the authentication results against a database of information to determine whether the target device is a counterfeit device.

9. The method of claim 1, wherein sending the authentication request to the target device to be authenticated and receiving an authentication response from the target device are performed after the authentication device is connected to the target device a first time to obtain a first authentication response, then the authentication device is disconnected from the target device and subsequently reconnected to the target device upon which sending the authentication request to the target device to be authenticated and receiving an authentication response from the target device are performed after the authentication device is connected to the target device a second time to obtain a second authentication response, and wherein analyzing the authentication response with the authentication application comprises comparing the first authentication response with the second authentication response, and declaring that the target device is authenticated when the first authentication response is consistent with the second authentication response, and otherwise declaring that the target device is not authenticated.

10. A system comprising:
   a calibration device that includes authentication algorithm configuration information and an authentication token; and
   an authentication device that includes an authentication application that runs on the authentication device and is used for authenticating a target device, wherein the authentication device:

sends to the calibration device a calibration request requesting authorization of the authentication device, wherein the authorization of the authentication device includes verifying that the authentication application on the authentication device is up-to-date;

in response to the calibration request, receives an updated version of the authentication application if the calibration device determines that the authentication application is not up-to-date, wherein the updated version of the authentication application is obtained from an authentication server;

receives from the calibration device the authentication algorithm configuration information and the authentication token, wherein the authentication algorithm configuration information includes information identifying one or more parameters or attributes to be authenticated by the authentication device that are associated with the target device, and the authentication token includes an authentication identifier associated with the authentication device;

sends to the target device an authentication request that includes the authentication token received from the calibration device;

receives an authentication response from the target device, wherein the authentication response includes a target device identifier associated with the target device; and determines whether the target device is authenticated by analyzing the authentication response with the authentication application based on the one or more parameters or attributes identified in the authentication algorithm configuration information.

11. The system of claim 10, wherein the authentication response includes one or more authentication device identifiers associated with corresponding one or more authentication devices which have attempted to authenticate the target device, and the target device identifier is stored by a read-write hardware security module in the target device, and wherein the authentication device analyzes the one or more authentication device identifiers and the target device identifier to determine whether the target device is authenticated.

12. The system of claim 11, wherein the target device includes a signal directing circuit that enables power from the authentication device to be connected to the read-write hardware security module in the target device when the target device is powered-down.

13. The system of claim 10, wherein the calibration device is a dongle that is configured to be connected to the authentication device.

14. The system of claim 10, wherein the calibration device is of a device type that is functionally the same as the target device.

15. The system of claim 10, wherein the authentication token associated with the authentication device indicates that the authentication application has been updated.

16. The system of claim 15, wherein the authentication response includes one or more authentication device identifiers associated with corresponding one or more authentication devices which have attempted to authenticate the target device, and the target device identifier is stored by a read-write hardware security module in the target device, and wherein the authentication application analyzes the one or more authentication device identifiers and the target device identifier to determine whether the target device is authenticated.

17. One or more non-transitory computer readable storage media encoded with instructions that, when executed by a processor, cause the processor to perform operations including:

sending to a calibration device a calibration request requesting authorization of an authentication device, wherein the authorization of the authentication device includes verifying that the authentication application on the authentication device is up-to-date;

in response to the calibration request, receiving an updated version of the authentication application if the calibration device determines that the authentication application is not up-to-date, wherein the updated version of the authentication application is obtained from an authentication server;

receiving authentication algorithm configuration information and an authentication token from the calibration device;

generating and supplying to a target device to be authenticated an authentication request that includes the authentication token received from the calibration device, wherein the authentication algorithm configuration information includes information identifying one or more parameters or attributes to be authenticated by the authentication device that are associated with the target device, and the authentication token includes an authentication identifier associated with the authentication device;

receiving an authentication response from the target device, wherein the authentication response includes a target device identifier associated with the target device; and determining whether the target device is authenticated by analyzing the authentication response with the authentication application based on the one or more parameters or attributes identified in the authentication algorithm configuration information.

18. The non-transitory computer readable storage media of claim 17, wherein the authentication token associated with the authentication device indicates that the authentication application has been updated.

19. The non-transitory computer readable storage media of claim 17, wherein the authentication response includes one or more authentication device identifiers associated with corresponding one or more authentication devices which have attempted to authenticate the target device.

20. The non-transitory computer readable storage media of claim 19, wherein the target device identifier is stored by a read-write hardware security module in the target device, and wherein the instructions that cause the processor to perform the operation of analyzing comprise instructions that perform analyzing of the one or more authentication device identifiers and the target device identifier to determine whether the target device is authenticated.

21. The non-transitory computer readable storage media of claim 17, further comprising instructions that cause the processor to perform operations of:

determining whether a validity period of the authentication algorithm configuration information has expired; and downloading from a server updated authentication algorithm configuration information when it is determined that the validity period of the authentication algorithm configuration information has expired.

22. An apparatus comprising:

at least one interface to enable connectivity to other devices;

a processor that executes an authentication application to:
send to a calibration device a calibration request requesting authorization of an authentication device, wherein the authorization of the authentication device includes verifying that the authentication application is up-to-date;
in response to the calibration request, receive an updated version of the authentication application if the calibration device determines that the authentication application is not up-to-date, wherein the updated version of the authentication application is obtained from an authentication server;
receive from the calibration device authentication algorithm configuration information and an authentication token, wherein the authentication algorithm configuration information includes information identifying one or more parameters or attributes to be authenticated by the authentication device that are associated with a target device, and the authentication token includes an authentication identifier associated with the authentication device;
generate for sending to the target device to be authenticated, an authentication request that includes the authentication token received from the calibration device; and
analyze an authentication response received from the target device to determine whether the target device is authenticated based on the one or more parameters or attributes identified in the authentication algorithm configuration information, wherein the authentication response includes a target device identifier associated with the target device.

23. The apparatus of claim 22, wherein the authentication token associated with the authorization device indicates that the authentication application has been updated.

24. The apparatus of claim 22, wherein the authentication response includes one or more authentication device identifiers associated with corresponding one or more authentication devices which have attempted to authenticate the target device.

25. The apparatus of claim 22, wherein the authentication response includes one or more authentication device identifiers associated with corresponding one or more authentication devices which have attempted to authenticate the target device, and the target device identifier is stored by a read-write hardware security module in the target device, and wherein the processor analyzes the one or more authentication device identifiers and the target device identifier to determine whether the target device is authenticated.

26. The apparatus of claim 22, wherein the processor executes the authentication application such that the authentication algorithm configuration information and the authentication token are received prior to generating the authentication request for supply to the target device.

27. The apparatus of claim 22, wherein the processor further:
determines whether a validity period of the authentication algorithm configuration information has expired; and
downloads from a server updated authentication algorithm configuration information when it is determined that the validity period of the authentication algorithm configuration information has expired.

* * * * *